US005659487A

United States Patent [19]

Cho et al.

[11] Patent Number: 5,659,487
[45] Date of Patent: Aug. 19, 1997

[54] METHOD FOR RECOVERING FROM SUN TRANSIT IN COMMUNICATION OF VERY SMALL APERTURE TERMINAL

[75] Inventors: Mi Sung Cho, Seoul; Jong Soo Park, Kyoungki-do, both of Rep. of Korea

[73] Assignee: Hyundai Electronics Industries, Co., Kyoungki-do, Rep. of Korea

[21] Appl. No.: 463,429

[22] Filed: Jun. 5, 1995

[30] Foreign Application Priority Data

Sep. 27, 1994 [KR] Rep. of Korea ............... 94-24315

[51] Int. Cl.$^6$ ..................................... H04B 7/185
[52] U.S. Cl. ............... 395/200.3; 455/12.1; 342/352
[58] Field of Search ................. 455/12.1, 13.4; 364/514 R; 342/352

[56] References Cited

U.S. PATENT DOCUMENTS

| 3,836,969 | 9/1974 | Bond et al. ............... 455/13.2 |
| 5,271,039 | 12/1993 | Suzuki ........................ 375/81 |
| 5,379,320 | 1/1995 | Fernandes et al. ............ 375/1 |

FOREIGN PATENT DOCUMENTS 5-110482  8/1993  Japan .

OTHER PUBLICATIONS

David P. O'Neil, "The rapid deployment digital satellite network," IEEE Comm. Mag. vol. 30, No. 1, pp. 30–35 Jan. 1992.
Klaus G. Johannsen, "Combatting sun outage in satellite television distribution systems," IEEE Trans. on Broadcasting, vol. 34, No. 1, pp. 18–23 Mar. 1988.

*Primary Examiner*—Douglas W. Olms
*Assistant Examiner*—Matthew C. Phillips
*Attorney, Agent, or Firm*—Fish & Richardson, P.C.

[57] ABSTRACT

A method for recovering from a sun transit in a communication of a very small aperture terminal (VSAT) is disclosed, in which the sun transit outrage (STO) is prevented by using a sun transit recovering algorithm, thereby making it possible to apply the very small aperture terminal (VSAT) to the satellite communication. Generally, the communication system of the very small aperture terminal (VSAT) in which a still track satellite is used includes a VSAT central station (VCS), a network management system (NMS), and a VSAT remote station (VRS). In this communication system, when the sun reaches near the boresight axis of an antenna, an STO phenomenon occurs, with the result that the communication system is influenced by the additional noise power of the sun. Consequently, the reliability of the communication system drops to below an average quality which is tolerable in an antenna communication system. Particularly, in a communication system using a still track satellite, the STO phenomenon occurs once every day near the spring equinox and the autumnal equinox, and therefore, problems are encountered in carrying out the communications. The present invention provides a method for recovering from a sun transit in a communication of a very small aperture terminal, in which, when an STO phenomenon occurs in the communication system, this is predicted by a network management system (NMS), and is informed to the VCS and to the VRS, so that the communication can be halted during the occurrence of an STO phenomenon, and that the communication can be resumed after the termination of the STO phenomenon.

9 Claims, 4 Drawing Sheets

_5,659,487_

METHOD FOR RECOVERING FROM SUN TRANSIT IN COMMUNICATION OF VERY SMALL APERTURE TERMINAL

BACKGROUND OF THE INVENTION

1. Field of the Invention

The present invention relates to a method for recovering from a sun transit in a communication of a very small aperture terminal (VSAT), in which a sun transit outrage (STO) is prevented by using a sun transit recovering algorithm, thereby making it possible to apply the very small aperture terminal (VSAT) to the satellite communication.

2. Description of the Prior Art

Generally, the communication system of the very small aperture terminal (VSAT) in which a still track satellite is used includes a VSAT central station (VCS), a network management system (NMS), and a VSAT remote station (VRS). In this communication system constituted as above, when the sun reaches near the boresight axis of an antenna, an STO phenomenon occurs, with the result that the communication system is influenced by the additional noise power of the sun. Consequently, the reliability of the communication system drops to below an average quality which is tolerable in an antenna communication system. Particularly, in a communication system using a still track satellite, the STO phenomenon occurs once every day near the spring equinox and the autumnal equinox, and therefore, problems are encountered in carrying out the communications.

Meanwhile, U.S. Pat. No. 5,271,039 discloses a local oscillating device for controlling the frequency in a communication system. This device includes: a satellite-modulated signal generating means; a local oscillating means provided with an oscillator for generating an oscillating frequency to furnish a sampling frequency to be controlled; an A/D converter for receiving the satellite-modulated signals to convert them into digital signals by using sampling clocks at the local oscillating means; a demodulating means for demodulating the received digital signals by using symbol clocks, for reproducing the symbol clocks to demodulate so as to detect the phase difference information between the symbol clocks and sampling clocks, and for receiving the digital signals from the A/D converter; and a control means for controlling the oscillating frequency of the local oscillating means based on the phase difference information between the symbol clocks and the sampling clocks, and for coupling with the demodulating means to output an oscillating frequency pre-set by the local oscillating means.

However, this apparatus could not solve the above described problem.

SUMMARY OF THE INVENTION

The present invention is intended to overcome the above described disadvantages of the conventional techniques.

Therefore it is the object of the present invention to provide a method for recovering from a sun transit in a communication of a very small aperture terminal (VSAT), in which, when an STO phenomenon occurs in the communication system, this is predicted by a network management system (NMS), and is informed to a VSAT central station (VCS) and to a VSAT remote station (VRS), so that the communication can be halted during the occurrence of an STO phenomenon, and that the communication can be resumed after the termination of the STO phenomenon.

In achieving the above object, in the communication system of a very small aperture terminal (VSAT) including a VCS, an NMS and a VRS, the communication system includes the steps of: predicting an STO phenomenon by a network management system (NMS), and sending a message for this predicted STO phenomenon to the VCS or to the VRS to make the communication halted during an occurrence of an STO at the VCS or at the VRS; attempting a reconnection to resume the communication after termination of the STO phenomenon; and establishing a connection state to resume the normal communication.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1A:
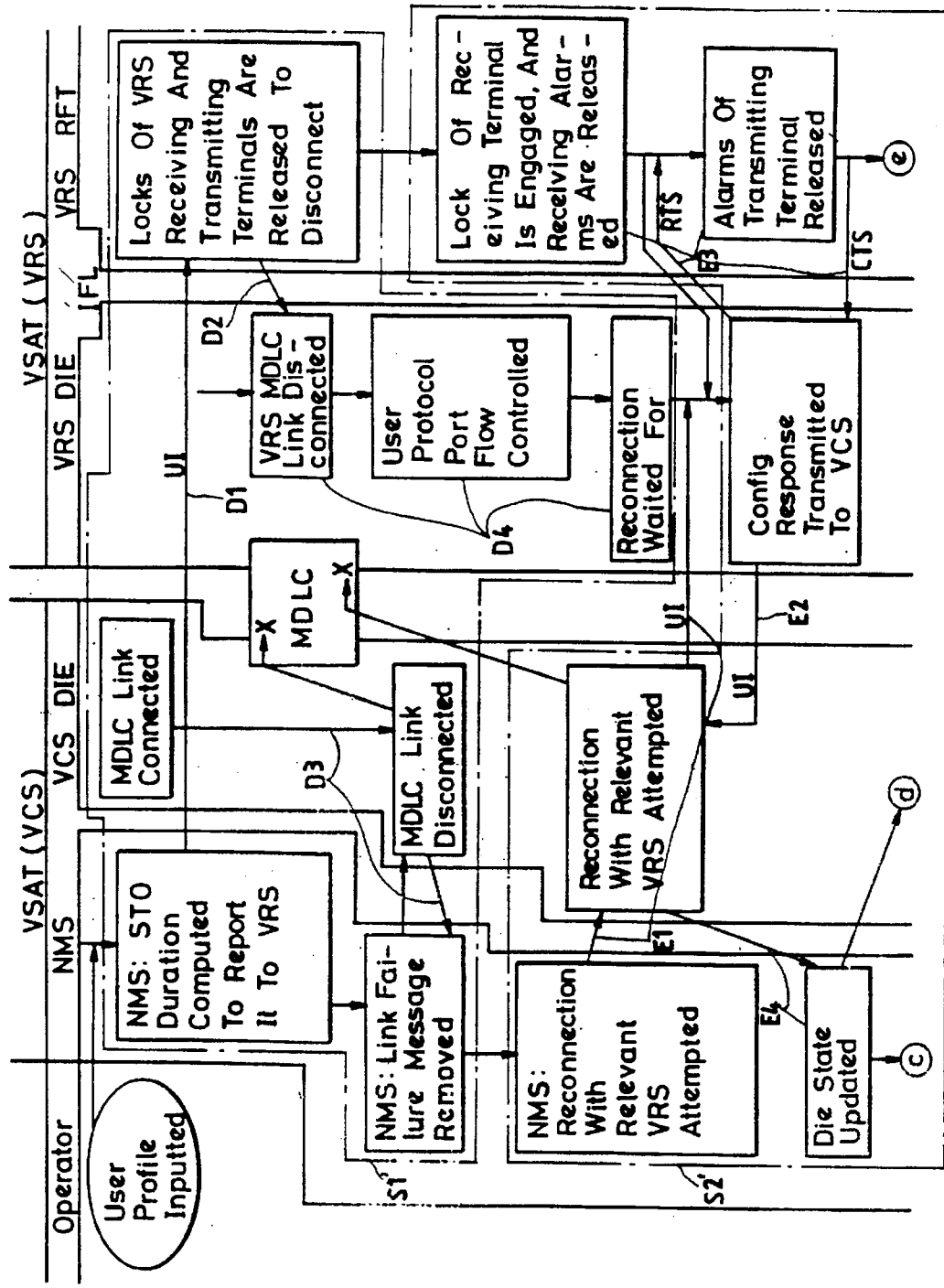
FIGS. 1(A) and 1(B) are sequential flow chart showing the method of treatment for an STO phenomenon occurred at the VCS during a communication of a VSAT.
Figure 1B:
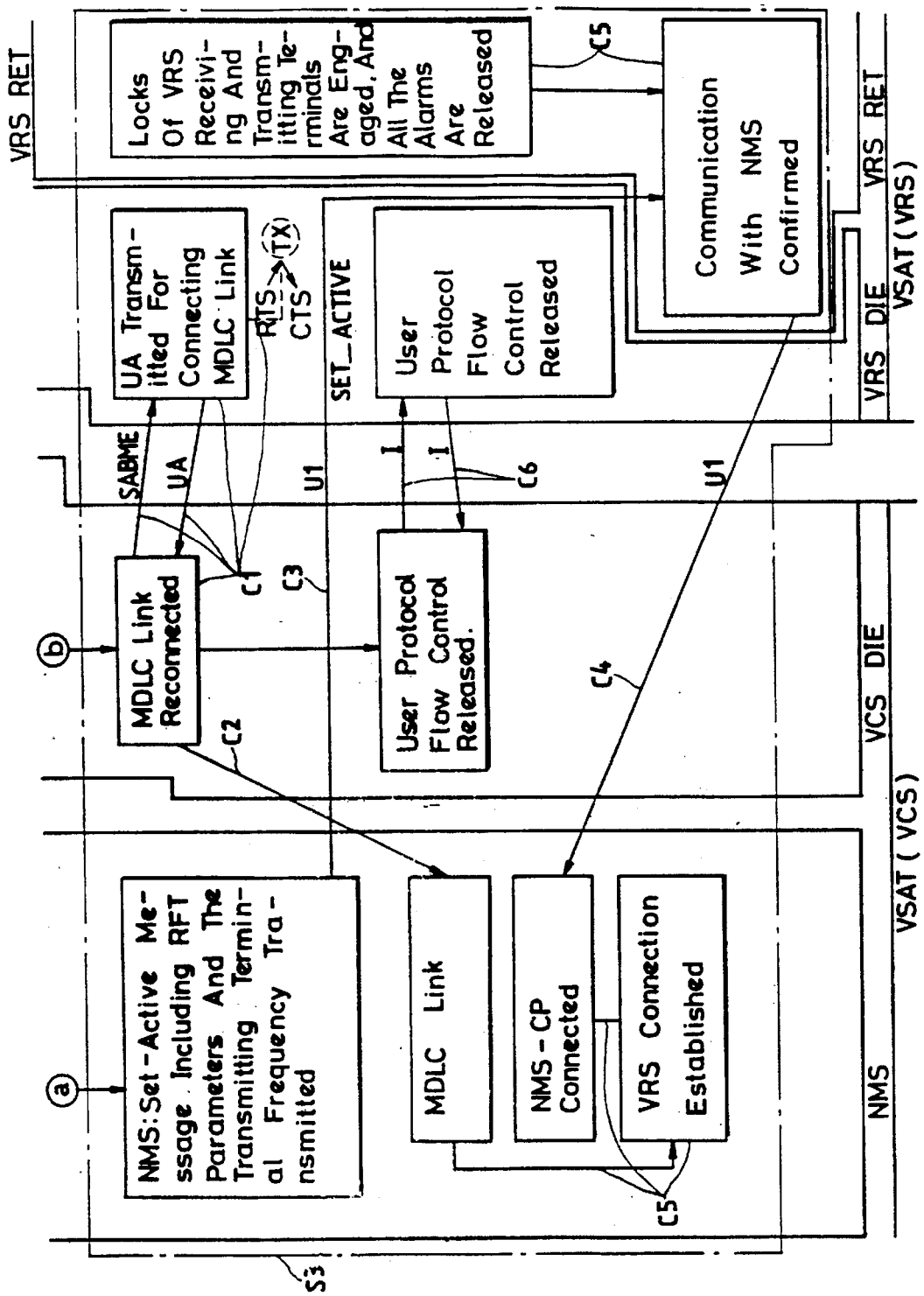

FIGS. 1(A) and 1(B) are sequential flow chart showing a method of treatment for an STO phenomenon occurred at the VCS during a communication of a VSAT.

The method includes the steps of: predicting an STO phenomenon to be occurred at a VCS by a network management system, and sending a message for the occurrence of the STO phenomenon to make the communication halted (first step S1); attempting to reconnect for resuming a normal communication, after termination of the STO phenomenon (second step S2); and establishing a connection state to resume the normal communication (third step S3).

The above described respective steps will be described in further detail below.

The first step S1, in which the network control system predicts the occurrence of the STO phenomenon to send a message for the occurrence of the STO phenomenon so as to make the communication halted, includes the sub-steps of: predicting an occurrence of an STO phenomenon at the VCS in accordance with an inputted profile of user, and computing a duration of the STO to inform the computed result to a data interface equipment (DIE) of the VCS (first sub-step A1); disconnecting a microtel data link control (MDLC) link by a connecting device of the VCS as user data are disabled upon receipt of the STO occurrence message, and informing the disconnected state to a data connection devices of the NMS and VRS (second sub-step A2); not displaying a message of a link failure during the STO by the NMS after receipt of the disconnection state by the link of the MDLC (third sub-step A3); and disconnecting the link of the MDLC corresponding to the VRS by the data connection device of the VRS after receipt of a link disconnection state, and then, controlling a user protocol port flow to make the communication halted (fourth sub-step A4).

After making the communication halted, when the STO phenomenon has ended, a resuming of the communication is attempted, and this corresponds to the second step S2 which will be described in detail below.

The second step S2 includes the sub-steps of: attempting a reconnection with a corresponding VRS by the network management system (NMS) upon termination of the STO phenomenon, and sending a UI frame, which stands for "unnumbered information" frame, to the data connection device of the VRS for attempting to reconnect the link of the microtel data link control (MDLC) to the corresponding VRS by the data connection device of the VCS (first sub-step B1); transmitting a config response UI frame to the data connection device of the VCS by the data connection device of the VRS after receipt of the UI frame, and transacting hardware signals RTS and CTS for communicating with a radio frequency transmitting terminal (RFT) of the VRS (second sub-step B2); and updating the state of the data connection device by the network management system (NMS), after receipt of the state of data connection device of the VCS (third sub-step B3).

After the completion of attempting a reconnection, a reconnection state is established for a normal communication, this being the third step S3.

The third step S3 includes the sub-steps of: transmitting a signal SABME, which stands for "set asynchronous balanced mode extended," as a protocol of the microtel data link control (MDLC) to the data connection device of the VRS by the data connection device of the VCS upon completion of updating the state of the data connection device, transmitting a UA frame by the data connection device of the VRS to the data connection device of the VCS for connecting the link of the microtel data link control link, and then, transacting hardware signals RTS and CTS for communication with the VRS (first sub-step C1); transmitting the reconnected state of the sub-step C1 to the network management system (NMS) (second sub-step C2); transmitting a set-active message including a transmitting frequency (Tx frequency) and a radio frequency transmitting terminal parameter to the VRS by the network management system (NMS) upon establishment of the reconnection (third sub-step C3); transmitting a UI frame response message to a CP of the network management system (NMS) by the radio frequency transmitting terminal of the VRS upon receipt of the set-active message at the third sub-step C3 (fourth sub-step C4); informing the connection establishment with the VRS together with the UI of the fourth sub-step C4 by the network management system (NMS) to the user after receipt of the reconnection state at the second sub-step C2 (fifth sub-step C5); and transacting I frames, which stands for "information" frame, between the data connection device of the VCS and the data connection device of the VRS to release the user protocol flow control, after completion of all the connection establishments (sixth sub-step C6).

Under this condition, a receiving terminal Rx and a transmitting terminal of the radio frequency transmitting terminal which has been disconnected are made to undergo an engagement of locks so as to be connected. At the same time, all the alarms are released, with the result that the communication with the network management system (NMS) is resumed in the normal manner. Further, signals which are transacted between the data connection device of the VRS and the radio frequency transmitting terminal of the VRS are transmitted through an intermediate cable.

Figure 2A:
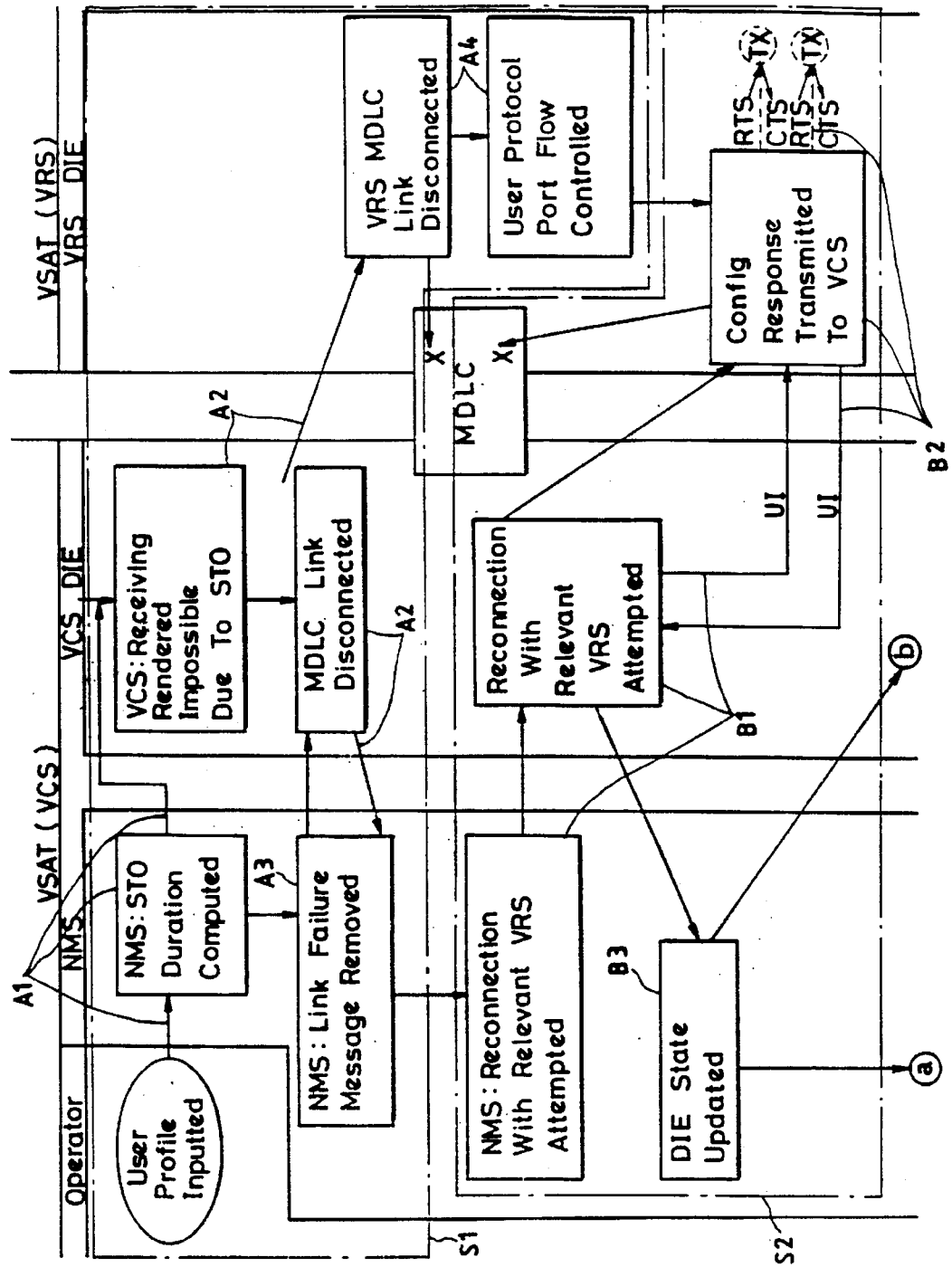
FIGS. 2(A) and 2(B) are sequential flow chart showing the method of treatment for an STO phenomenon occurred at the VRS during a communication of a VSAT.
Figure 2B:
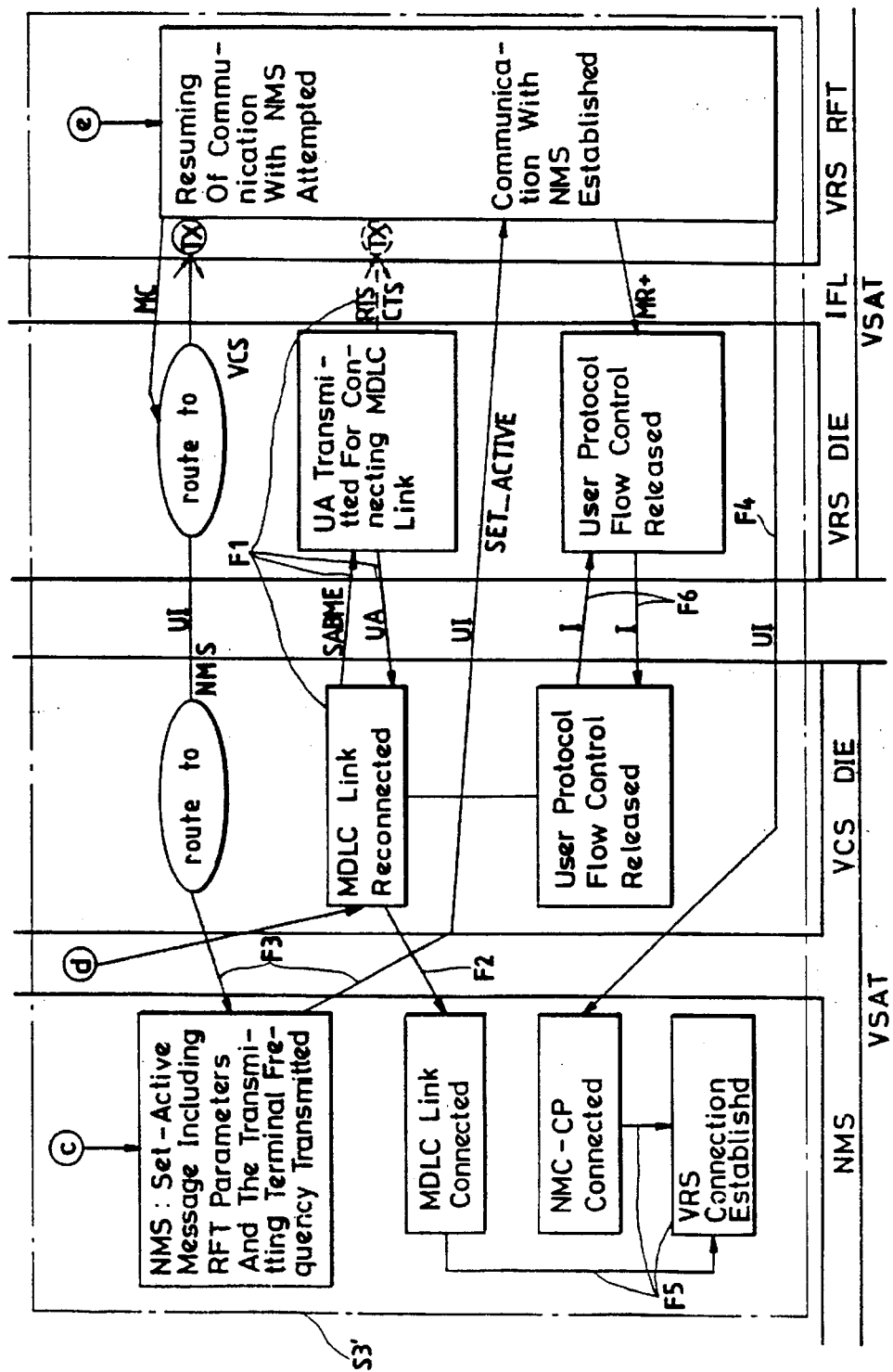

FIG. 2(A) and 2(b) are sequential flow chart showing a method of treatment for an STO phenomenon occurred at VRS during a communication of a VSAT.

The method for recovering from an STO in this case includes the steps of: predicting an occurrence of an STO phenomenon at the VRS by a network management system (NMS), and transmitting a message for the occurrence of an STO phenomenon to make the communication halted during the STO phenomenon (first step S1'); attempting to reconnect for a normal communication upon termination of the STO phenomenon after the halting of the communication at the first step S1' (second step S2'); and establishing a connection to resume the normal communication (third step S3').

The above steps will be described in further details below.

The first step S1', in which the network management system (NMS) predicts an occurrence of the STO phenomenon at the VRS to send a message for the STO phenomenon occurrence so as to make the communication halted, includes the sub-steps of: predicting an occurrence of an STO phenomenon at the VRS by the network management system (NMS) in accordance with a profile of user, and computing the duration of the STO phenomenon to inform the computed result to the VRS (first sub-step D1); declaring a modem-not-ready state by the VRS upon receipt of the STO occurrence message, closing locks, i.e., disconnecting the connection state of the receiving and transmission, and transmitting this state to the data connection device of the VRS (second sub-step D2); disconnecting the microtel data link control link by the data connection device of the VCS upon receipt of the STP phenomenon message at the first sub-step D1, transmitting this disconnected state to the network management system (NMS), and not displaying the disconnected state due to the STO phenomenon by the network management system (third sub-step D3); and receiving the state of the transmitted modem at the second sub-step D2 by the data connection device of the VRS after receipt of the STO phenomenon occurrence message, disconnecting the state of the microtel data link control link of the VRS, controlling the user protocol port flow, and waiting for a reconnection (fourth sub-step D4).

Thus the occurrence of an STO phenomenon is predicted in advance, and after the termination of the STO phenomenon, a resuming of communication is attempted. This attempt corresponds to the second step S2'.

The second step S2' includes the sub-steps of: attempting a reconnection with the VRS by the relevant network management system, and transmitting a UI frame to the data connection device of the VRS by the data connection device of the VCS for attempting a reconnection of the microtel data link control link with the relevant VRS (first sub-step E1); transmitting a config response UI frame by the data connection device of the VRS to the data connection device of the VCS, after receipt of the UI frame (second sub-step E2); locking the receiving terminal Rx to release the alarm by the radio frequency transmitting terminal RFT upon transmission of the UI frame, receiving a hardware signal RTS to release transmissions from the data connection device of the VRS, releasing the alarm of the transmitting terminal Tx, and transmitting a hardware signal CTS to the data connection device of the VRS to inform of the release of the alarm of the transmitting terminal (third sub-step E3); and updating the state of the data connection device by the network management system (NMS) after receipt of the state of the data connection device of the VCS from the VCS (fourth sub-step E4).

When the attempt for the reconnection is completed, a reconnection state is established to resume the normal communication, and this corresponds to the third step S3' of the VRS.

The third step S3' includes the sub-steps of: transmitting a signal SABME as the protocol of the microtel data link control to the data connection device of the VRS by the data connection device of the VCS upon completion of updating the state of the data connection device, transmitting a UA frame for connecting the microtel data link control link to the data connection device of the VCS by the data connection device of the VRS, and transacting hardware signals RTS and CTS for communication with the VRS (first sub-step F1); transmitting the reconnected state of the sub-step F1 to the network management system (NMS) (second sub-step F2); transmitting a UI frame message to the network management system (NMS) by the VRS upon releasing of the alarm of the transmitting terminal for establishing the communication with the network management system (NMS), and responding by the network management system (NMS) by transmitting a set-active message including a radio frequency transmitting terminal parameter and a transmitting terminal frequency Tx to a radio frequency transmitting terminal of the VRS (third sub-step F3); responding by the radio frequency transmitting terminal of the VRS upon receipt of the set-active message by transmitting a response UI frame message to a CP of the network management system (NMS-CP) (fourth sub-step F4); informing the state of the connection establishment with the VRS together with the UI frame of the fourth sub-step F4 to the user by the network management system (NMS) after receipt of the reconnection state at the second sub-step F2 (fifth sub-step F5); and transacting I frames between the data connection device of the VCS and the data connection device of the VRS upon completion of all the connection establishments to release the user protocol flow control (sixth sub-step F6).

Further, in the present invention in which the above described steps are carried out in a sequential manner, when the communication is halted or resumed between the network management system and the VRS, the communication can be resumed only after transacting the hardware signals. These signals are transmitted through an intermediate frequency cable. Among the signals lines which are inputted into the microtel data link control (MDLC) of FIGS. 1 and 2, the mark "x" indicates that the link is disconnected.

According to the present invention as described above, a prediction is made on a disconnection of communication due to an STO phenomenon which is caused by the sun near the spring equinox and the autumnal equinox. During the STO phenomenon, the communication is temporarily halted, so that loss of data and generation of errors can be prevented.

What is claimed is:

1. A method for recovering from a sun transit in a communication of a very small aperture terminal (VSAT), with a VCS, an NMS and a VRS involved, the method comprising the steps of:

predicting a sun transit outage (STO) phenomenon by a network management system (NMS) to cope with it upon expecting said STO phenomenon at said VCS or at said VRS, and sending a message for said STO phenomenon to said VCS or to said VRS to make the communication halted during said occurrence of said STO phenomenon at said VCS or at said VRS (first step S1, S1');

attempting a reconnection to resume the communication after termination of the STO phenomenon (second step S2, S2'); and establishing a connection state to resume a normal communication (third step S3, S3');

wherein if said STO phenomenon occurs at said VCS, then the step of predicting said STO phenomenon and sending the message for said STO phenomenon to said VCS further comprises the sub-steps:

predicting said STO phenomenon at the VCS in accordance with an inputted user profile, and computing a duration of said STO phenomenon to inform the computed result to a data interface equipment (DIE) of said VCS (first sub-step A1);

disconnecting a microtel data link control (MDLC) link by a data connecting device of said VCS as user data are disabled upon receipt of the STO occurrence message, and informing the disconnected state to data connection devices of said NMS and VRS (second sub-step A2);

not displaying a message of a link failure during said STO phenomenon by said NMS after receipt of the disconnection state by the link of said MDLC (third sub-step A3); and disconnecting the link of said MDLC corresponding to said VRS by said data connection device of said VRS after receipt of a link disconnection state, and then, controlling a user protocol port flow to make the communication halted (fourth sub-step A4).

2. The method as claimed in claim 1, wherein, if said STO phenomenon occurs at the VCS, then the step of attempting the reconnection comprises the sub-steps of:

attempting a reconnection with a corresponding VRS by said network management system NMS upon termination of said STO phenomenon, and sending a UI frame to said data connection device of said VRS for attempting to reconnect the link of said microtel data link control (MDLC) to the corresponding VRS by said data connection device of said VCS (first sub-step B1);

transmitting a config response UI frame to said data connection device of said VCS by said data connection device of said VRS after receipt of the UI frame, and transacting hardware signals RTS and CTS for communicating with a radio frequency transmitting terminal (RFT) of said VRS (second sub-step B2); and updating the state of said data connection device by said network management system (NMS), after receipt of the state of said data connection device of said VCS (third sub-step B3).

3. The method as claimed in claim 1, wherein, if said STO phenomenon occurs at said VCS, then the step of establishing the connection state comprises the sub-steps of:

transmitting a signal SABME as a protocol of said microtel data link control (MDLC) to said data connection device of said VRS by said data connection device of said VCS upon completion of updating the state of said data connection device, transmitting a UA frame by said data connection device of said VRS to said data connection device of said VCS for connecting the link of said microtel data link control link, and then, transacting hardware signals RTS and CTS for communication with said VRS (first sub-step C1);

transmitting the reconnected state of the sub-step C1 to said network management system (NMS) (second sub-step C2);

transmitting a set-active message including a transmitting frequency (Tx frequency) and a radio frequency transmitting terminal parameter to said VRS by said network management system (NMS) upon establishment of the reconnection (third sub-step C3);

transmitting a UI frame response message to a CP of said network management system (NMS) by the radio frequency transmitting terminal of said VRS upon receipt of the set-active message at the third sub-step C3 (fourth sub-step C4);

informing the connection establishment with said VRS together with the UI of the fourth sub-step C4 by said network management system (NMS) to the user after receipt of a reconnection state at the second sub-step C2 (fifth sub-step C5); and transacting I frames between said data connection device of said VCS and said data connection device of said VRS to release the user protocol flow control, after completion of all the connection establishments (sixth sub-step C6).

4. The method as claimed in claim 1, wherein, if said STO phenomenon occurs at said VRS, then the step of predicting the STO phenomenon and sending the message for said STO phenomenon to said VRS comprises the sub-steps of:

predicting an occurrence of an STO phenomenon at said VRS by said network management system (NMS) in accordance with the inputted user profile, and computing a duration of said STO phenomenon to inform the computed result to said VRS (first sub-step D1);

declaring a modem-not-ready state by said VRS upon receipt of the STO occurrence message, disconnecting the connection state, and transmitting this state to said data connection device of said VRS (second sub-step D2);

disconnecting said microtel data link control link by said data connection device of said VCS upon receipt of the STO phenomenon message at the first sub-step D1, transmitting this disconnected state to said network management system (NMS), and not displaying the disconnected state due to said STO phenomenon by said network management system (NMS) (third sub-step D3); and receiving the state of the transmitted modem at the second sub-step by said data connection device of said VRS after receipt of the STO phenomenon occurrence message, disconnecting the state of said microtel data link control link of said VRS, controlling the user protocol port flow, and waiting for a reconnection (fourth sub-step D4).

5. The method as claimed in claim 1, wherein, if said STO phenomenon occurs at said VRS, then the step of attempting the reconnection comprises the sub-steps of:

attempting a reconnection with said VRS by the relevant network management system, and transmitting a UI frame to said data connection device of said VRS by said data connection device of said VCS for attempting a reconnection of said microtel data link control link with the relevant VRS (first sub-step E1);

transmitting a config response UI frame by said data connection device of said VRS to said data connection device of said VCS, after receipt of the UI frame (second sub-step E2);

locking the receiving terminal Rx to release the alarm by the radio frequency transmitting terminal RFT upon transmission of the UI frame, receiving a hardware signal RTS to release transmissions from said data connection device of said VRS, releasing the alarm of the transmitting terminal Tx, and transmitting a hardware signal CTS to said data connection device of said VRS to inform of the release of the alarm of the transmitting terminal (third sub-step E3); and updating the state of the data connection device by said network management system (NMS) after receipt of the state of said data connection device of said VCS from the VCS (fourth sub-step E4).

6. The method as claimed in claim 1, wherein, if said STO phenomenon occurs at said VRS, the step of establishing the connection state comprises the sub-steps of:

transmitting a signal SABME as a protocol of said microtel data link control to said data connection device of said VRS by said data connection device of said VCS upon completion of updating the state of said data connection device, transmitting a UA frame for connecting said microtel data link control link to said data connection device of said VCS by said data connection device of said VRS, and transacting hardware signals RTS and CTS for communication with said VRS (first sub-step F1);

transmitting the reconnected state of the sub-step F1 to said network management system (NMS) (second sub-step F2);

transmitting a UI frame message to said network management system (NMS) by said VRS upon releasing of the alarm of the transmitting terminal for establishing the communication with said network management system (NMS), and responding by said network management system (NMS) by transmitting a set-active message including a radio frequency transmitting terminal parameter and a transmitting terminal frequency Tx to a radio frequency transmitting terminal of said VRS (third sub-step F3);

responding by the radio frequency transmitting terminal of said VRS upon receipt of the set-active message by transmitting a response UI frame message to a CP of said network management system (NMS-CP) (fourth sub-step F4);

informing a state of connection establishment with said VRS together with the UI frame of the fourth sub-step F4 to the user by said network management system (NMS) after receipt of the reconnection state at the second sub-step F2 (fifth sub-step F5); and transacting I frames between said data connection device of said VCS and said data connection device of said VRS upon completion of all the connection establishments to release the user protocol flow control (sixth sub-step F6).

7. A method for recovering from a sun transit in a communication of a very small aperture terminal (VSAT), with a VCS, an NMS and a VRS involved, the method comprising the steps of:

predicting a sun transit outage (STO) phenomenon by a network management system (NMS) to cope with it upon expecting said STO phenomenon at said VRS, and sending a message for said STO phenomenon to said VRS to make the communication halted during said STO phenomenon at said VRS (first step S1');

attempting a reconnection to resume the communication after termination of the STO phenomenon (second step S2'); and establishing a connection state to resume a normal communication (third step S3');

wherein the step of predicting the STO phenomenon and sending the message for said STO phenomenon to said VRS further comprises the sub-steps:

predicting an occurrence of an STO phenomenon at said VRS by said network management system (NMS) in accordance with an inputted user profile, and computing a duration of said STO phenomenon to inform the computed result to said VRS (first sub-step D1);

declaring a modem-not-ready state by said VRS upon receipt of the STO occurrence message, disconnecting the connection state, and transmitting this state to said data connection device of said VRS (second sub-step D2);

disconnecting said microtel data link control link by said data connection device of said VCS upon receipt of the STO phenomenon message at the first sub-step D1, transmitting this disconnected state to said network management system (NMS), and not displaying the disconnected state due to said STO phenomenon by said network management system (NMS) (third sub-step D3); and receiving the state of the transmitted modem at the second sub-step by said data connection device of said VRS after receipt of the STO phenomenon occurrence message, disconnecting the state of said microtel data link control link of said VRS, controlling the user protocol port flow, and waiting for a reconnection (fourth sub-step D4).

8. The method as claimed in claim 7, wherein the step of attempting the reconnection comprises the sub-steps of:

attempting a reconnection with said VRS by the relevant network management system, and transmitting a UI frame to said data connection device of said VRS by said data connection device of said VCS for attempting a reconnection of said microtel data link control link with the relevant VRS (first sub-step E1);

transmitting a config response UI frame by said data connection device of said VRS to said data connection device of said VCS, after receipt of the UI frame (second sub-step E2);

locking the receiving terminal Rx to release the alarm by the radio frequency transmitting terminal RFT upon transmission of the UI frame, receiving a hardware signal RTS to release transmissions from said data connection device of said VRS, releasing the alarm of the transmitting terminal Tx, and transmitting a hardware signal CTS to said data connection device of said VRS to inform of the release of the alarm of the transmitting terminal (third sub-step E3); and updating the state of the data connection device by said network management system (NMS) after receipt of the state of said data connection device of said VCS from the VCS (fourth sub-step E4).

9. The method as claimed in claim 7, wherein the step of establishing the connection comprises the sub-steps of:

transmitting a signal SABME as a protocol of said microtel data link control to said data connection device of said VRS by said data connection device of said VCS upon completion of updating the state of said data connection device, transmitting a UA frame for connecting said microtel data link control link to said data connection device of said VCS by said data connection device of said VRS, and transacting hardware signals RTS and CTS for communication with said VRS (first sub-step F1);

transmitting the reconnected state of the sub-step F1 to said network management system (NMS) (second sub-step F2);

transmitting a UI frame message to said network management system (NMS) by said VRS upon releasing of the alarm of the transmitting terminal for establishing the communication with said network management system (NMS), and responding by said network management system (NMS) by transmitting a set-active message including a radio frequency transmitting terminal parameter and a transmitting terminal frequency Tx to a radio frequency transmitting terminal of said VRS (third sub-step F3);

responding by the radio frequency transmitting terminal of said VRS upon receipt of the set-active message by transmitting a response UI frame message to a CP of said network management system (NMS-CP) (fourth sub-step F4);

informing a state of connection establishment with said VRS together with the UI frame of the fourth sub-step F4 to the user by said network management system (NMS) after receipt of the reconnection state at the second sub-step F2 (fifth sub-step F5); and transacting I frames between said data connection device of said VCS and said data connection device of said VRS upon completion of all the connection establishments to release the user protocol flow control (sixth sub-step F6).

* * * * *